United States Patent
Suters et al.

Patent Number: 6,088,332
Date of Patent: *Jul. 11, 2000

[54] DATA BUS SYSTEM WITH RESOURCE CONTROL COMPENSATING FOR LIMITED TRANSMISSION CAPACITY

[75] Inventors: Thomas A. H. M. Suters, Eindhoven, Netherlands; Ronald W. J. J. Saeijs, Nürnberg, Germany; Rudolf H. J. Bloks; Jurgen F. Rosengren, both of Eindhoven, Netherlands

[73] Assignee: U.S. Philips Corporation, New York, N.Y.

[*] Notice: This patent is subject to a terminal disclaimer.

[21] Appl. No.: 09/273,218

[22] Filed: Mar. 19, 1999

Related U.S. Application Data

[63] Continuation of application No. 08/664,071, Jun. 13, 1996, Pat. No. 5,886,983.

[30] Foreign Application Priority Data

Jun. 15, 1995 [EP] European Pat. Off. ............... 95201599

[51] Int. Cl.[7] ........................................................ H04J 3/14
[52] U.S. Cl. .......................... 370/235; 370/230; 370/252; 370/329; 370/362; 370/468
[58] Field of Search ..................... 370/230, 235, 370/271, 341, 362, 363, 466, 468, 475, 329, 252

[56] References Cited

U.S. PATENT DOCUMENTS

| | | | |
|---|---|---|---|
| 4,926,375 | 5/1990 | Mercer et al. | 370/475 |
| 4,932,022 | 6/1990 | Keeney et al. | 370/271 |
| 5,282,205 | 1/1994 | Kuznicki | 370/94.1 |
| 5,631,908 | 5/1997 | Saxe | 370/235 |
| 5,703,871 | 12/1997 | Pope et al. | 370/248 |
| 5,886,983 | 3/1999 | Suters et al. | 370/235 |

FOREIGN PATENT DOCUMENTS

0535860a2  4/1993  European Pat. Off. ........ H04L 12/56

OTHER PUBLICATIONS

IEEE Standard for a High Performance Serial Bus, P1394/Draft 7.1v1 Aug. 5, 1994.

*Primary Examiner*—Douglas W. Olms
*Assistant Examiner*—Shick Hom
*Attorney, Agent, or Firm*—Daniel J. Piotrowski

[57] ABSTRACT

A data bus system comprises a number of stations which are interconnected via a bus. The bus has a limited data transmission capacity available. From a transmitter station a resource control station reads which part of the available transmission capacity is required for the relevant transmitter. The resource control station allocates the required transmission capacity to the relevant transmitter station if adequate transmission capacity is available; it is only in that case that transmission by the relevant transmitter station is enabled.

12 Claims, 1 Drawing Sheet

DATA BUS SYSTEM WITH RESOURCE CONTROL COMPENSATING FOR LIMITED TRANSMISSION CAPACITY

CROSS REFERENCE TO RELATED APPLICATION

This application is a continuation of application Ser. No. 08/664,071, filed Jun. 13, 1996 now U.S. Pat. No. 5,886,983.

BACKGROUND OF THE INVENTION

The invention relates to a data bus system, comprising a plurality of stations, including at least two transmitter stations, each transmitter station being switchable to an active mode in which the relevant transmitter station digitally transmits an own data stream for which at least a transmission capacity which is specific of the relevant transmitter station is required, bus means which interconnect the stations of said plurality and have a transmission capacity available for transporting the own data streams between the stations.

For a detailed example of such a system reference is made to the P1394 bus system proposed in an IEEE standard publication. A data stream represents, for example an audio signal or a video signal. In that case a transmitter station is, for example a CD player, a tuner or a video recorder and transmits such a data stream via the bus means for as long as it is in the active mode.

If the transmission capacity required for all transmitter stations simultaneously operating in the active mode is greater than the available transmission capacity of the bus means, the operation of the bus system will not be satisfactory. For example, consider the case where the data streams are subdivided into frames which can be transmitted via the bus means only after a successful arbitration procedure. If too many transmitter stations operate simultaneously in the active mode, there will be stations which lose the arbitration so often that they cannot transmit the entire data stream.

SUMMARY OF THE INVENTION

Therefore, it is desirable to control the system in such a manner that the number of transmitter stations simultaneously operating in the active mode is not too large. To this end, it is necessary for a resource control station to know how much transmission capacity is required by the various stations operating in the active mode. At the same time it should be possible for new transmitter stations to be connected to the bus means without the resource control station having to be changed.

Therefore, it is inter alia an object of the invention to guarantee in a data bus system of the kind set forth that the number of stations simultaneously operating in the active mode will not be too large, it nevertheless being possible to connect new transmitter stations to the bus means without a resource control station having to be changed.

The invention relates to a data bus system, comprising resource control means for controlling which transmitter stations simultaneously operate in the active mode, the resource control means being arranged to guarantee that a sum of the specific transmission capacities required for the own data streams of the transmitter stations simultaneously operating in the active mode does not exceed the available transmission capacity of the bus means, at least one of the transmitter stations being arranged to enable the reading out, via the bus means, of a code representing the specific transmission capacity required for the own data stream of said at least one transmitter station,— and the resource control means being arranged to read out the code via the bus means and to base the guarantee on the code read out.

Thus, transmitter stations are not switched to the active mode unless sufficient transmission capacity is available for transmitting its data stream functionally simultaneously with the data streams of the other active transmitter stations. The magnitude of the required transmission capacity is read out by the allocation control means, via the bus means. As a result, different members of a family of transmitter stations which require mutually different transmission capacities can be used without the allocation control means requiring advance knowledge of the transmission capacity required by the various members of the family.

In an embodiment of the data bus system in accordance with the invention each of the stations has its own position within a topological structure of the data bus system, a topological transmission capacity required therein for the transmission of the data stream for each transmitter station being dependent on the specific transmission capacity as well as on the own position of the relevant transmitter station, in which system the resource control means update a representation of the topological structure and guarantee that the available transmission capacity of the bus means is not smaller than a further sum of the topological transmission capacities required for the respective data streams of the transmitter stations simultaneously operating in the active mode if all said stations were to occupy a position within the topological structure which maximizes the required topological transmission capacities.

The topology-specific transmission capacity taken up in the further sum for the one transmitter station capacity, therefore, is based on two different sources: the code originating from the one transmitter station and the representation of the topological structure originating from a station serving for the resource control means.

The topological structure is, for example a tree structure in which the bus means connect each station directly to a "parent" station and one or more "child" stations, at least in as far as these stations are not a "root" station (has no "parent" station) or a "leaf" station (has no "child" station). Thus, all stations are connected to one another either directly or indirectly via other stations in the tree structure. Upon transmission of a data stream, the transmitter station transmits the data stream to its parent station and child station (stations). Any other station receiving the data stream from a parent station or child station applies the data stream to the other connected stations whereto it is directly connected. The data stream is thus transmitted through the entire tree structure. The maximum delays then occurring, however, are longer as the position of a transmitter station is situated further from the position of the remotest "leaf" station. In addition to the minimum transmission capacity required for a transmitter station, an overhead of transmission capacity must also be available for the delay. As the delay is longer, this overhead will be larger; therefore, the overhead is larger as the position of the transmitter station is situated further from that of the remotest "leaf" station. Overhead may also be due to other causes, for example arbitration.

In the above embodiment the overhead would then always be taken as large as necessary for the two leaf stations situated furthest apart. The overhead is larger as the tree structure is deeper (comprises more stations between root and leaves).

In a further embodiment of the data system in accordance with the invention each of the stations has its own position within a topological structure of the data bus system, a topological transmission capacity required therein for the transmission of the data stream for each transmitter station being dependent on the respective transmission capacity as well as on the own position of the relevant transmitter station, in which system the resource control means update a representation of the topological structure and guarantee that a further sum of the topological transmission capacities required for the respective data streams of the transmitter stations simultaneously operating in the active mode does not exceed the available transmission capacity of the bus means.

The overhead in the topology-specific transmission capacity will thus in principle be different for each station and equal to the minimum overhead required for broadcasting the data stream through the entire topological structure.

In a further embodiment of the data bus system in accordance with the invention the code is a digital numerical representation of the transmission capacity which can be directly arithmetically manipulated. Consequently, the guarantee does not require a further translation operation, for example by means of a table in which a capacity is coupled to every feasible code. Other information, for example the type of data stream (for example, video or audio) is separately encoded, so that one and the same type of data stream can be transmitted with variably adjustable transmission capacities.

In a further embodiment of the data bus system in accordance with the invention the resource control means comprise a resource control station which is arranged to control the transmitter stations via the bus means.

In a further embodiment of the data bus system in accordance with the invention the resource control means comprise a resource allocation station which is arranged to reserve, in response to a request received via the bus means, a part of the available transmission capacity for a transmitter station, provided that enough non-reserved transmission capacity is available for the relevant transmitter station.

The resource allocation station may be separate from the resource control station. Different resource control stations can thus control different transmitter stations, a central resource allocation station then guaranteeing that not too much transmission capacity is used. Further transmitter stations can thus also independently start data streams.

The invention also relates to a data bus system, comprising a plurality of stations, including at least two transmitter stations, each transmitter station being switchable to an active mode in which the relevant transmitter station transmits a respective data stream, bus means which interconnect the stations of said plurality, the data bus system also comprising resource control means for controlling which transmitter stations simultaneously operate in the active mode, the resource control means being arranged to assign different identifiers, via the bus means, to the transmitter stations simultaneously operating in the active mode, the transmitter stations being arranged to provide each separately receivable part of its data stream with the identifier assigned to the relevant transmitter station.

The control means thus ensure that the different data streams can be distinguished by receiver stations. On the basis of the identifier a transmitter station can determine whether or not it has to process the relevant data stream.

The invention also relates to transmitter stations and families of transmitter stations for use in the data bus system.

These and other aspects of the invention will be apparent from and elucidated with reference to the embodiments described hereinafter.

DETAILED DESCRIPTION OF THE INVENTION

Figure 1:
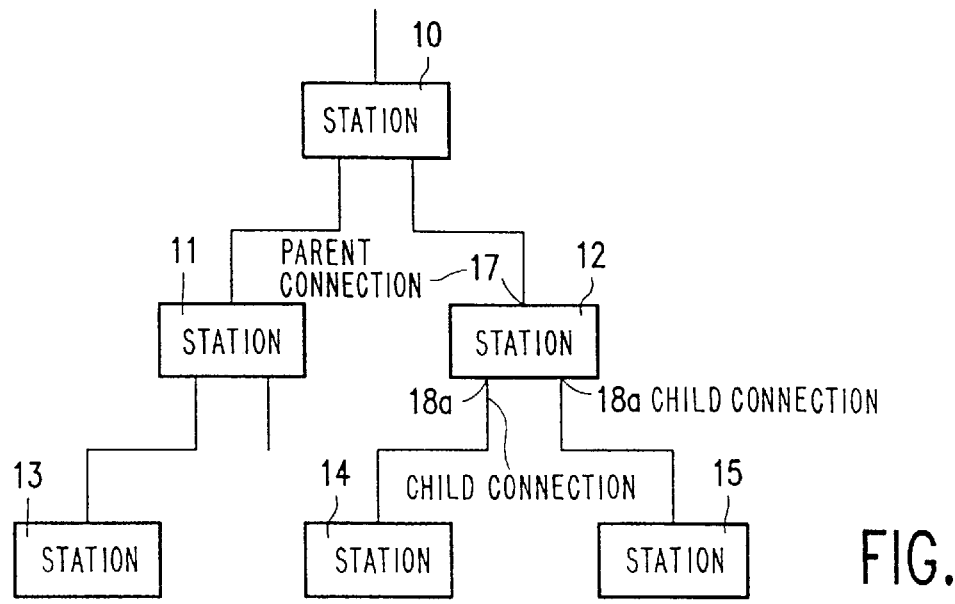
FIG. 1 shows a data bus system.

FIG. 1 shows a data bus system with a number of stations 10, 11, 12, 13, 14, 15. The stations 10, 11, 12, 13, 14, 15 are coupled to one another via bus connections. Different types of connections are feasible. In the Figure each station has the same three connections for the bus connections; for example, the station 12 has a "parent" connection 17 and two "child" connections 18a,b.

The data bus system thus has a tree structure in which one station 10 is the "root" station of the tree structure. Two "child" stations 11, 12 are connected to the "root" station 10. One further "child" is connected to the "child" station 11. Two further "child" stations 14, 15 are connected to the "child" station 12. No further "child" stations are connected to the further child stations 13, 14, 15, so that these stations are "leaf" stations in the tree structure.

During operation data streams are transmitted between the stations 10–15. For example, if a transmitter station 12 operates in an active mode, it transmits a data stream via the connections 18a,b. The data stream then arrives at the three directly neighboring stations 10, 14, 15 which themselves transmit this stream to their direct neighbor stations 11 by transmission via the relevant connections. These neighbor stations again transmit the stream to their neighbors, so that the data stream ultimately reaches all stations 10–15 in the tree structure. Thus, all stations 10–15 which have to process the data stream can indeed receive this data stream.

A plurality of transmitter stations in the tree structure can simultaneously operate in the active mode. In order to enable all stations to transmit an own data stream, the transmission capacity of the bus system is distributed between the stations operating in the active mode. This can be realized, for example by time sharing.

Figure 2:
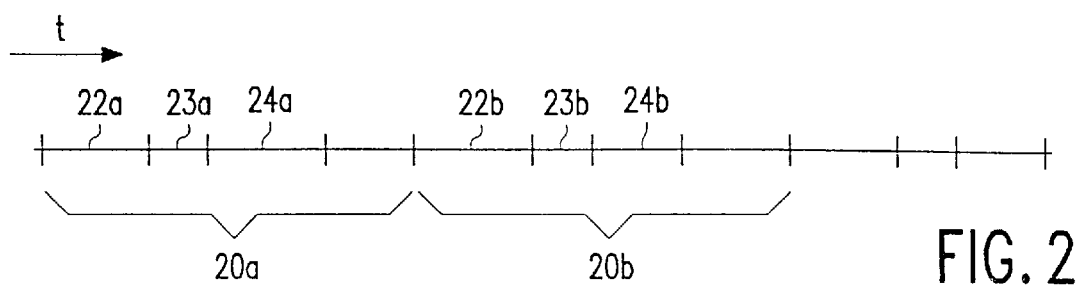
FIG. 2 shows a time axis with periods.

FIG. 2 illustrates the transmission of a plurality of data streams by different stations on the basis of time sharing. In the Figure there is plotted a time axis which is subdivided into periods 20a–b. For the purpose of illustration it is assumed that three transmitter stations (for example, the stations 11, 12 and 15) simultaneously operate in the active mode. In each of the periods 20a–b these stations will then transmit a part of their own data stream, each time during an own time interval 22a–b, 23a–b, 24a–b in the relevant period. The total transmission capacity of the bus is thus defined by the duration of a period 20a,b and the transmission capacity required for each of the transmitter stations is defined by the duration of the time interval 22a,b, 23a,b, 24a,b used by the relevant station for transmission during each period 20a,b. If the duration of a period is, for example 125 microseconds and approximately 12,500 bits can be transmitted within one period, for example a transmitter station for an audio data stream with 3 Mb per second will intrinsically require a time interval of approximately 3% of the period.

Evidently, the transmission capacity can also be distributed in other ways, for example in the form of different frequency bands in which respective transmitter stations can transmit data, or in the form of a part M/N of the total number of conductors N available between the stations (for example, in this case the connection 17 thus comprises N conductors).

The choice as to which transmitter station is in the active mode in which part of a period can be made in a variety of ways, for example by allocating in advance a time slot of the period 20*a,b* to each station in the active mode, but also by bus contention. In an example of bus contention each station wishing to transmit part of its own data stream first checks whether the bus is free. In that case the station attempts to claimed the bus by applying a claim signal to the station connected to its parent connection. This station normally applies said claim signal to the station connected to its parent connection, etc. until the root station is reached.

If a plurality of stations simultaneously attempt to claim the bus, at least one station will receive two claim signals on its child connections. This station then arbitrates which of these claim signals is applied further. The root station may also receive two claim signals and the root station then also decides which signal is selected. Thus, in the root station one signal which has won the arbitration prevails. The root station signals its child stations which signal has won the arbitration. The child stations apply said return signal to their children again, so that it is clear which station has won the arbitration. This station can then transmit the relevant part of its own data stream via the bus.

After transmission, the remaining active stations can again attempt to claim the bus so as to transmit their part of the data stream. For as long as the number of stations simultaneously operating in the active mode is not too large, and these stations do not wish to transmit too much data per period, each of the stations operating in the active mode will have its turn so as to transmit its own data stream.

In order to ensure that all stations operating in the active mode can transmit their own data stream, the system comprises a resource control station and a resource allocation station (for example, both in the station 11). The resource control station receives requests to establish connections between stations and to start data streams. In response thereto the resource control station selects the transmitter stations to be set to the active mode, determines which part of the transmission capacity is required, and requests the resource allocation station to allocate the associated transmission capacity for each of said transmitter stations. The resource allocation station ensures that no more transmission capacity is allocated than available on the bus. If more transmission capacity is requested, the allocation station, for example returns a refusal so that the resource control station can, for example apply an error signal to the user.

From each of the transmitter stations to be switched to the active mode the resource control station reads how much transmission capacity is required by the relevant station. Thus, a variety of stations can be connected to the data bus system without it being necessary for the resource control station to contain advance information concerning the amount of transmission capacity required.

Figure 3:
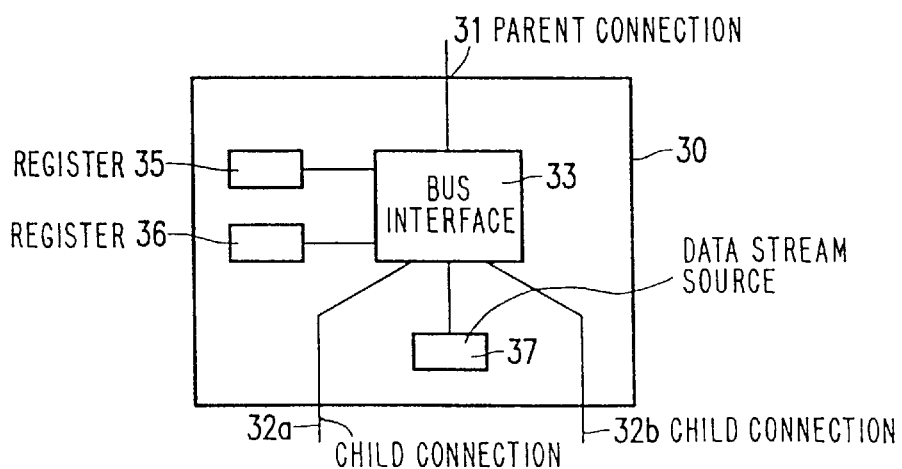
FIG. 3 shows a transmitter station.

FIG. 3 shows an embodiment of a transmitter station 30. This station comprises a parent connection 31 and two child connections 32*a,b*. The station 30 comprises a bus interface 33 which is connected to the parent connection 31 and the child connections 32*a,b*. The bus interface 33 is also connected to two registers 35, 36 and a data stream source 37.

The bus interface is arranged to enable the reading out of information from the registers 35, 36, via the connections 31, 32*a,b* and under the control of another station, and the transmission of this information to said other station via the connections 31, 32*a,b*. The information in the register 35 then constitutes a code concerning the amount of transmission capacity required. This information may be permanent, for example as when the station is a compact disc player for which a fixed information rate must be reserved (for example, 2×32 bit words having a frequency of 44.1 kHz). This information may also be variable, as in the case of a station capable of producing different kinds of data streams.

During operation the resource control station reads this information from the register 35, reserves the transmission capacity in conformity with this information, and subsequently transmits a command to the station 30 whereby the latter is switched to the active mode. The station 30 can then start to transmit the data stream from the source 37 via the bus connections 31, 32*a,b*, the transmission capacity then used not being more than indicated by the information in the register 35.

The transmitter station can thus form part of a family of transmitter stations, each of which has a structure as shown in FIG. 3. Each member of such a family requires an own amount of transmission capacity for the transmission of its data stream. The information to be read from the register 35 then differs for different members of the family of transmitter stations, depending on whether more or less transmission capacity is required. If a single station is capable of transmission in different types of active modes, requiring mutually different transmission capacities (for example, modes with audio, video, compressed video data streams), the information in the register 35 may also differ within a single station, depending on whether more or less transmission capacity is required for the transmission mode in which the station is to transmit.

The bandwidth required for a data stream can depend not only on the intrinsic properties of the data stream itself, but also on the structure of the bus. For example, in the tree structure shown in FIG. 1 the time required to transmit a data stream from a leaf station (for example, 14) to another leaf station (for example, 13) will be longer than the time required to transmit a data stream from the root station 10 to another station (for example, 13). This time is dependent on the structure of the bus connections in the system.

For as long as the end of the part of the data stream transmitted by a transmitter station during a period has not propagated through the entire tree structure, other transmitter stations cannot yet start transmission. Therefore, for the time required for transferring the data from the transmitter station to all "leaf" stations a part of the transmission capacity must also be allocated (this holds for "broadcast" transmission, where all stations can in principle receive and process the data stream, as well as for point-to-point transmission, where a single known station receives and processes the data stream).

Furthermore, the time required for arbitration will also be longer as a station in the tree structure is situated further from the root station. A part of the transmission capacity must also be allocated for this arbitration time.

Another example of structure-dependency concerns a linear structure in which all stations are connected in parallel to a bus connection. In that case the physical length of the bus connection must be taken into account. As this connection is longer, more time must be allocated. In the case of a bus having a loop structure the number of stations along the loop must be taken into account.

In order to enable such overhead to be taken into account, the allocation control station stores information regarding the topological structure of the bus (for example, the fact that a tree structure is concerned and also the maximum number of stations between the root station and the leaf stations, or information concerning the physical length of the bus). After the allocation control station has read information concerning the required transmission capacity from the register 35, on the basis of the information concerning the topological structure it calculates how much transmission capacity is actually required and subsequently reserves this amount of transmission capacity.

This calculation can be performed in various ways. For example, the worst-case capacity can be taken; for example, in the case of FIG. 1 this can be done by adding the transmission time of the two leaf stations 13, 15 which are situated furthest apart to the time required for the data stream, and by adding thereto the worst-case time required for arbitration (i.e. the time required for transmitting the claim signal from a leaf station to the root and vice versa for acknowledgement that the arbitration has been won). Alternatively, the allocation control signal can perform a station-dependent calculation in which the overhead required for the specific transmitter station is taken into account. In the case of FIG. 1, for example the transmission from the root station 10 will be allocated less additional transmission time than the transmission by a leaf station 13.

In addition to the allocation of transmission capacity, the data bus system can also be used to control the identification of the various data streams. If more than one data stream is involved, the stations receiving data via the bus must be capable of determining which stream they have to receive.

Figure 4:
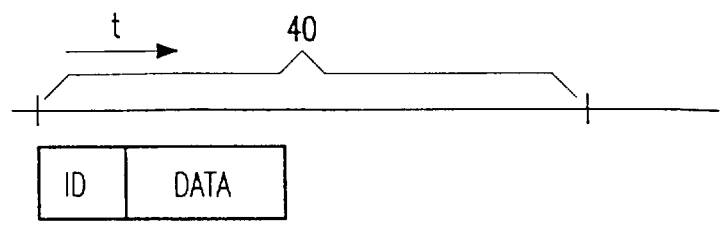
FIG. 4 shows a time axis with a frame.

FIG. 4 shows a period 40 along a time axis. In this period there is indicated a message frame 42 which contains an identification ID and data DATA. All transmitter stations operating in the active mode subdivide their own data stream into such frames and transmit, for example, each time one frame per period. The identification ID serves to enable every receiving station to determine where or not the frame forms part of a data stream to be processed by the relevant station. A plurality of receiving stations can in principle process the same data stream.

The identification should be unique for the data stream. This is achieved in the data bus system in that there is provided an identification control station. Upon request this station outputs an identification which is applied to a transmitter station before it is switched to the active mode. In the transmitter station the identification is written, for example into the second register 36. Upon transmission this identification is always added to the frames as the identification ID. The identification control station ensures that always different identifications are issued. When a transmitter station is switched out of the active mode, the identification and the bandwidth used are returned to the identification control station and the allocation station, respectively, so that they can be used again for other data streams.

What is claimed is:

1. A data bus system, comprising
a plurality of stations, including at least two transmitter stations, each transmitter station being switchable to an active mode in which a relevant transmitter station transmits a respective data stream,
bus means which interconnect the stations of said plurality of stations,
the data bus system also comprising
resource control means for controlling which transmitter stations simultaneously operate in the active mode, the resource control means being arranged to assign different identifiers, via the bus means, to the transmitter stations simultaneously operating in the active mode,
the transmitter stations being arranged to provide each separately receivable part of its data stream with the identifier assigned to the relevant transmitter station.

2. The data bus system as claimed in claim 1, in which each of the stations has its own position within a topological structure of the data bus system, in which a topological transmission capacity required for the transmission of the data stream for each transmitter station is dependent on the specific transmission capacity as well as on the own position of the relevant transmitter station, in which the resource control means update a representation of the topological structure and guarantee that the available transmission capacity of the bus means is not smaller than a further sum of the topological transmission capacities required for the respective data streams of the transmitter stations simultaneously operating in the active mode if all said stations were to occupy a position within the topological structure which maximizes the required topological transmission capacities.

3. The data bus system as claimed in claim 1, in which each of the stations has its own position within a topological structure of the data bus system, in which a topological transmission capacity required for the transmission of the data stream for each transmitter station is dependent on the respective transmission capacity as well as on the own position of the relevant transmitter station, in which the resource control means update a representation of the topological structure and guarantee that a further sum of the topological transmission capacities required for the respective data streams of the transmitter stations simultaneously operating in the active mode does not exceed the available transmission capacity of the bus means.

4. The data bus system as claimed in claim 2 or 3, in which the code is a digital numerical representation of the transmission capacity which can be directly arithmetically manipulated.

5. The data bus system as claimed in claim 1 in which the resource control means comprise a resource control station which is arranged to control the transmitter stations via the bus means.

6. The data bus system as claimed in claim 5, in which the resource control means comprise a resource allocation station which is arranged to reserve, in response to a request received via the bus means, a part of the available transmission capacity for a transmitter station, provided that enough non-reserved transmission capacity is available for the relevant transmitter station.

7. A family of transmitter stations for use in a data bus system as claimed in claim 1, in which each transmitter station of the family comprises a connection for communication via the bus means and can be switched to an active mode in which the transmitter station digitally transmits an own data stream via the bus means, in which different members of the family require mutually different specific transmission capacities for the transmission of the own data stream, and in which each transmitter station also comprises read means which enable the reading out, via the bus means, of an own code representing the specific transmission capacity required for the transmission of the own data stream by the relevant transmitter station of the family.

8. A transmitter station for the data bus system as claimed in claim 1, which transmitter station comprises a connection for communication via the bus means and can be switched to the active mode in which it digitally transmits an own data stream via the bus means, which transmitter station also comprises identification receiving means and is arranged to provide each separately receivable part of the data stream upon transmission with one of the identifiers received by the identification receiving means.

9. A transmitter station for use in a data bus system that comprises a plurality of stations interconnected via bus means, the transmitter station comprising a connection for communication via the bus means, means for assuming an active mode in which the transmitter station digitally transmits an own data stream via the bus means using a specific transmission capacity of the bus means, read means for enabling the reading out, via the bus means, of a code representing the specific transmission capacity required for the transmission of the own data stream of the transmitter station.

10. The transmitter station as claimed in claim 9, wherein the read means comprises registers, including a register containing said code, a bus interface for enabling the reading out of information from the registers.

11. The transmitter station as claimed in claim 10, wherein the register containing said code contains permanent information.

12. The transmitter station as claimed in claim 10, wherein the transmitter station is capable of producing different kinds of data streams, the transmitter station varying the information in the register that contains that code according to the kind of data stream that is to be produced.

* * * * *